(12) United States Patent
Nelson et al.

(10) Patent No.: US 11,991,070 B2
(45) Date of Patent: May 21, 2024

(54) LAYER-2 PATH TRACING

(71) Applicant: Hewlett Packard Enterprise Development LP, Houston, TX (US)

(72) Inventors: Alexander K. Nelson, Roseville, CA (US); Goldy Tomy, Roseville, CA (US); Luis A. Mora, Roseville, CA (US); Saurabh Mohan, Folsom, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 66 days.

(21) Appl. No.: 17/568,623

(22) Filed: Jan. 4, 2022

(65) Prior Publication Data
US 2023/0216779 A1    Jul. 6, 2023

(51) Int. Cl.
*H04L 45/00* (2022.01)
*H04L 12/46* (2006.01)
*H04L 45/02* (2022.01)

(52) U.S. Cl.
CPC .......... *H04L 45/26* (2013.01); *H04L 12/4633* (2013.01); *H04L 45/02* (2013.01); *H04L 45/20* (2013.01); *H04L 45/66* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 6,538,997 B1 * | 3/2003 | Wang | H04L 12/462 370/256 |
| 7,733,856 B2 | 6/2010 | Hongal et al. | |
| 9,124,529 B1 * | 9/2015 | Chadha | H04L 45/02 |
| 9,894,122 B2 | 2/2018 | Pani et al. | |
| 9,985,794 B2 | 5/2018 | Pani | |

(Continued)

FOREIGN PATENT DOCUMENTS

WO    WO-2022115114 A1 *    6/2022

OTHER PUBLICATIONS

Branigan et al., "What can you do with Traceroute?", IEEE Internet Computing, vol. 5, Issue: 5, , Sep.-Oct. 2001, 1 page.

(Continued)

*Primary Examiner* — Christine T Duong
(74) *Attorney, Agent, or Firm* — Park, Vaughan, Fleming & Dowler LLP

(57) ABSTRACT

A system for layer-2 path tracing is provided. During operation, the system can send, from an originating device, a layer-2 trace packet with a packet type in a layer-2 header of the layer-2 trace packet. The packet type can indicate the trace packet to be a tracing packet. The system can then receive a layer-2 response packet from a respective participating device, which supports layer-2 path tracing, on a path to a target device of the trace packet. Subsequently, the system can obtain, from a payload of the response packet, trace information of a forward path to the participating device traversed by the trace packet and a reverse path from the participating device traversed by the response packet. The trace information can identify one or more layer-2 devices along the forward and reverse paths, and include one or more layer-2 identifiers corresponding to the identified one or more layer-2 devices.

20 Claims, 11 Drawing Sheets

(56) References Cited

U.S. PATENT DOCUMENTS

| | | | |
|---|---|---|---|
| 2005/0094630 A1* | 5/2005 | Valdevit | H04L 45/12 370/360 |
| 2006/0013142 A1* | 1/2006 | Hongal | H04L 12/4675 370/248 |
| 2016/0112481 A1* | 4/2016 | Pani | H04L 65/611 370/390 |
| 2018/0337839 A1* | 11/2018 | Bristow | H04L 12/4633 |

OTHER PUBLICATIONS

"Configuring VXLAN OAM," Cisco Technology Inc., Jul. 8, 2021, pp. 1-10.

* cited by examiner

LAYER-2 PATH TRACING

BACKGROUND

Field

The present disclosure relates to communication networks. More specifically, the present disclosure relates to a method and system for facilitating hop-by-hop layer-2 path tracing.

BRIEF DESCRIPTION OF THE FIGURES

In the figures, like reference numerals refer to the same figure elements.

DETAILED DESCRIPTION

Figure 1A:
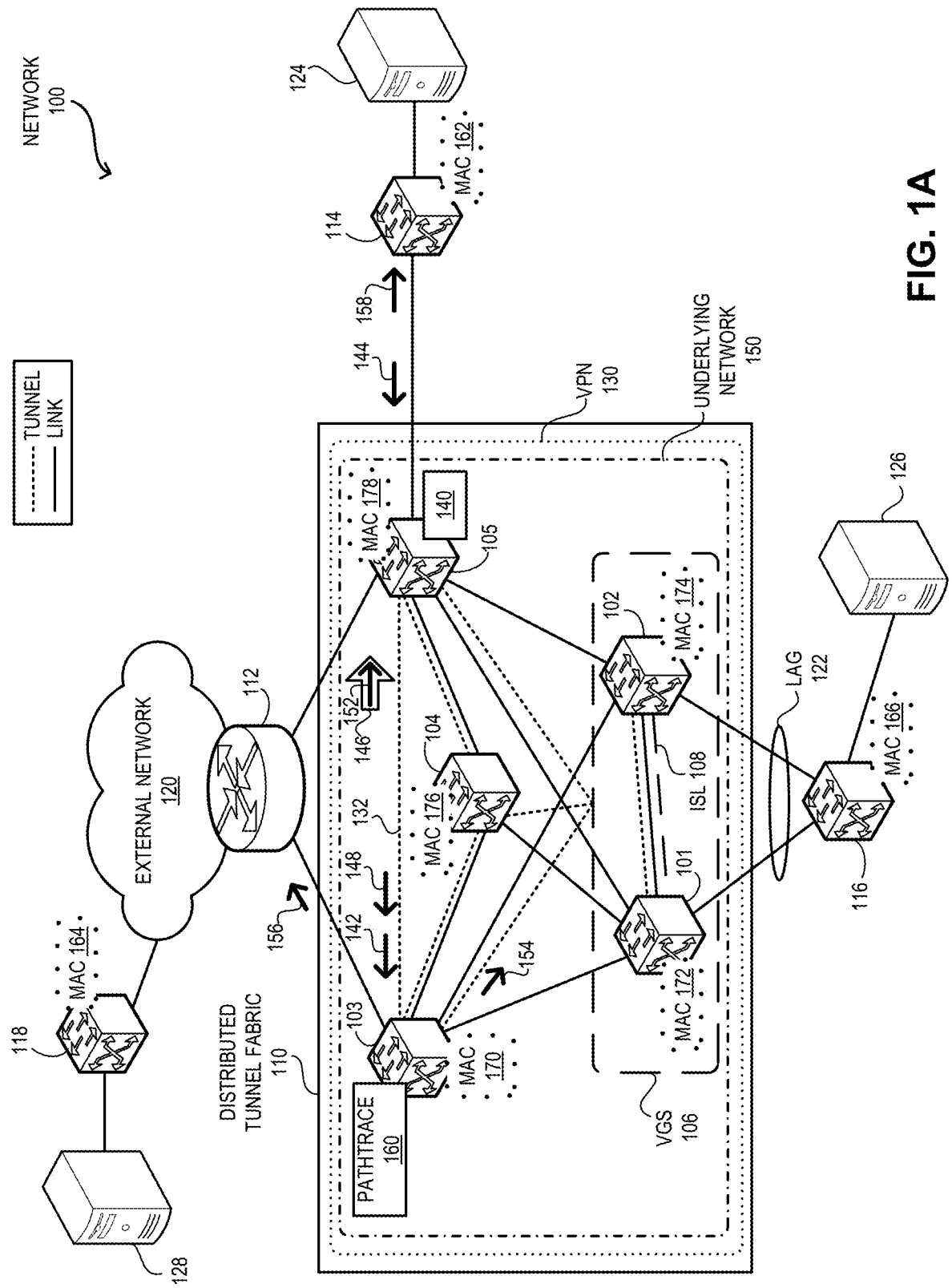
FIG. 1A illustrates an example of layer-2 path tracing in a heterogeneous network, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

Internet is the delivery medium for a variety of applications running on physical and virtual devices. Such applications have brought with them an increasing traffic demand. As a result, equipment vendors race to build switches with versatile capabilities. To do so, a switch may support different protocols and services. Layer-2 protocols, such as Ethernet, facilitate the operations of a number of such protocols and services. As a result, identifying issues in layer-2 paths (e.g., links and nodes) can be essential for troubleshooting. Examples of such issues can include, but are not limited to, layer-2 configuration errors, cabling issues, and identifying layer-2 loops.

Features, such as a tunnel spanning a layer-2 domain over a layer-3 network, may improve the efficiency of a network. For example, a switch can support a tunnel with a remote switch (e.g., a virtual extensible local area network (VXLAN) tunnel). A respective tunnel endpoint may map a respective client virtual local area network (VLAN) to a corresponding tunnel network identifier (TNI), which can identify a virtual network for a tunnel. The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP).

However, managing and troubleshooting in a complex network with tunnels and link aggregations (LAGs) can be challenging. Tracing layer-2 paths can enhance the debugging process in such a network. Traceroute is a tool to diagnose network issues at layer-3 (e.g., based on the Internet Protocol (IP)). However, a similar tool does not exist for layer-2 (e.g., for Ethernet). Due to the lack of tracing capabilities in layer-2, diagnosing issues at layer-2 can be challenging. Furthermore, heterogeneous networks with overlay technologies, such as tunnels, can enhance the complexity of the tracing process.

One aspect of the present technology can provide a system for layer-2 path tracing. During operation, the system can send, from an originating device, a layer-2 trace packet with a packet type in a layer-2 header of the layer-2 trace packet. The packet type can indicate the layer-2 trace packet to be a tracing packet. The system can then receive a layer-2 response packet from a respective participating device, which supports layer-2 path tracing, on a path to a target device of the layer-2 trace packet. Subsequently, the system can obtain, from a payload of the layer-2 response packet, trace information of a forward path to the participating device traversed by the layer-2 trace packet and a reverse path from the participating device traversed by the layer-2 response packet. The trace information can identify one or more layer-2 devices along the forward and reverse paths, and may include one or more layer-2 identifiers corresponding to the identified one or more layer-2 devices.

In a variation on this aspect, the layer-2 trace packet and the layer-2 response packet can be associated with a virtual local area network (VLAN). The one or more layer-2 devices can then belong to the VLAN.

In a variation on this aspect, the trace information, for a respective of the identified one or more layer-2 devices, can also include one or more of: a port identifier and a hostname.

In a variation on this aspect, the system can encapsulate the layer-2 trace packet in a tunnel header associated with a tunnel between the originating device and a remote endpoint. The tunnel can be formed based on a tunneling protocol.

In a further variation, the trace information can indicate the tunnel as the layer-2 hop.

In a variation on this aspect, the system can set a time-to-leave (TTL) value in the header based on a predetermined initial value. The initial value may indicate a number of layer-2 hops to be traced. Accordingly, the TTL value can be decremented at a respective participating device.

In a further variation, the system can receive the layer-2 response packet from a participating device at which the TTL value has reached an expiration value. Accordingly, the layer-2 response packet can then include an indicator indicating the TTL value reaching the expiration value.

In a variation on this aspect, the system can set a layer-2 address of the target device as a destination address of the layer-2 trace packet. The destination address may not be modified for the layer-2 trace packet at a respective layer-2 hop.

In a variation on this aspect, a direction indicator in the layer-2 trace packet can indicate a forward direction to the target device. Similarly, the direction indicator in the layer-2 response packet can indicate a reverse direction to the originating device.

In a variation on this aspect, the forward and reverse paths can include one or more non-participating devices that do not support layer-2 path tracing. The non-participating devices may include one or more of: an intermediate device and the target device.

The aspects described herein solve the problem of providing layer-2 path tracing in a heterogeneous network by (i) sending a layer-2 trace packet that can accumulate information on a forward path to a target device; and (ii) receiving a response trace packet that can accumulate information on a reverse path from a respective participating device of the path. A respective participating device can support and participate in the layer-2 path tracing. The participating device can append its local information to the trace packets on both forward and reverse paths. Consequently, the originating device can obtain information from a respective participating layer-2 hop on the path to the target device.

With existing technologies, layer-2 tracing in a heterogeneous network is limited. Such tracing may not support layer-2 hops across a tunnel or via a LAG. To address this limitation, layer-3 tracing mechanisms, such as traceroute, are often applied on a VXLAN tunnel by sending a packet with increasing time-to-leave (TTL) between two VTEPs of the VXLAN tunnel. However, the packet may only trace hops in the underlying physical network of the VXLAN tunnel. As a result, the extension of a layer-2 domain across the VXLAN tunnel (e.g., using VNIs) may not be represented by the packet. In other words, the single layer-2 hop across a tunnel is not traced by the packet. Furthermore, some traceroute variants may provide layer-2 information of layer-3 hops based on their respective Internet Protocol (IP) addresses. However, the information collected by such a variant is limited to the layer-3 route taken by the packet.

To solve this problem, a layer-2 tracing mechanism can be used for accumulating layer-2 information for a respective layer-2 hop on a path to a target device. The layer-2 tracing mechanism can be referred to "tracepath" since the mechanism traces a path. Tracepath may use a layer-2 trace packet, such as an Ethernet frame, for tracing the path. The trace packet can be issued, forwarded, and responded to based on corresponding layer-2 addresses (e.g., media access control (MAC) addresses). Consequently, tracepath can facilitate an opposite operation of the existing solutions by considering a layer-2 domain spanning across a VXLAN as a single layer-2 hop.

During operation, an originating device can send a layer-2 trace packet to a target device. The trace packet can include a layer-2 header comprising a packet type indicating the packet to be a trace packet and a TTL value. If the trace packet is an Ethernet frame, the packet type can be indicated by the Ethertype field of the Ethernet header. The originating device can initialize the TTL value based on an initial TTL value. The source and destination addresses of the header can correspond to the layer-2 addresses (e.g., MAC addresses) of the originating and target devices, respectively. The payload of the trace packet can include a direction indicator (e.g., a Boolean value) indicating forward trace to the target device. The payload can also include trace information of the local device in association with the forward direction. Trace information associated with the local device can include one or more of: a hostname of the device, a port identifier of the port used for the packet, and a layer-2 address (e.g., a MAC address) of the device.

The packet can be processed by a respective layer-2 hop to the path to the target device based on the packet type and the destination address. If the device of the layer-2 hop supports tracepath, the device can identify the packet to be a trace packet based on the packet type and participate in the tracing process. Accordingly, the layer-2 hop and the device can be referred to as a participating hop and a participating device, respectively. On the other hand, if the device of the layer-2 hop does not support tracepath, the device can forward the packet to the next layer-2 hop based on the destination address of the packet. Hence, tracepath can incorporate a combination of participating and non-participating layer-2 hops.

A participating device can be a networking device (e.g., a switch) or a host (e.g., a user device). If the participating device is an intermediate device (i.e., not the target device), the participating device can append the local trace information in the payload in association with the forward direction and decrement the TTL value in the header. The participating device can then forward the updated packet to the next layer-2 hop based on the destination address of the packet. This process of appending trace information is performed by a respective participating device on a path to the target device. As a result, the trace packet can accumulate trace information at a respective participating layer-2 hop on the forward path to the target device. On the other hand, if the participating device is the target device, upon appending the local trace information, the participating device terminates the forward trace.

A respective participating device can also generate a copy of the packet as a response packet. The participating device can change the direction indicator in the payload to indicate a reverse trace to the originating device. The payload of the response packet can also include trace information of the local device in association with the reverse direction. The participating device can set the layer-2 addresses of the participating and originating devices as the source and destination addresses, respectively, of the response packet. The participating device can then forward the response packet to the next layer-2 hop via a path back to the originating device. This process of appending trace information is performed by a respective participating device on a path to the originating device. As a result, the trace packet can accumulate trace information at a respective participating layer-2 hop on the reverse path to the originating device.

Since the response packet is generated from a copy of the trace packet, the response packet can also include the forward trace information up to the participating device. In this way, the originating device can receive a response packet from a respective participating layer-2 hop, including the target device. The response packet can include both forward and reverse layer-2 traces up to the participating device in the layer-2 payload. Since tracepath can be deployed in layer-2 using layer-2 addresses, tracepath does not rely on any layer-3 based solutions (e.g., traceroute) and does not require looking up an Address Resolution Protocol (ARP) table for an IP address. Furthermore, the trace packet is encapsulated with a tunnel header for traversing a tunnel. As a result, tracepath can consider a tunnel as a single layer-2 hop between the endpoints and combine tunnels with layer-2 hops.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of layer-2 path tracing in a heterogeneous network, in accordance with an aspect of the present application. A heterogeneous network 100 can include a number of switches and devices, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105, which are associated with MAC addresses 172, 174, 170, 176, and 178, respectively.

Figure 1B:
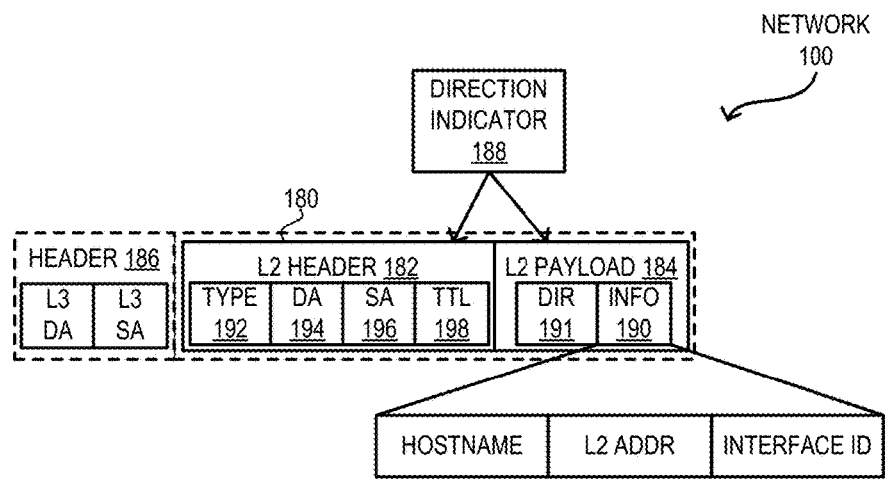
FIG. 1B illustrates an example of a layer-2 path tracing packet, in accordance with an aspect of the present application.
Figure 1B:
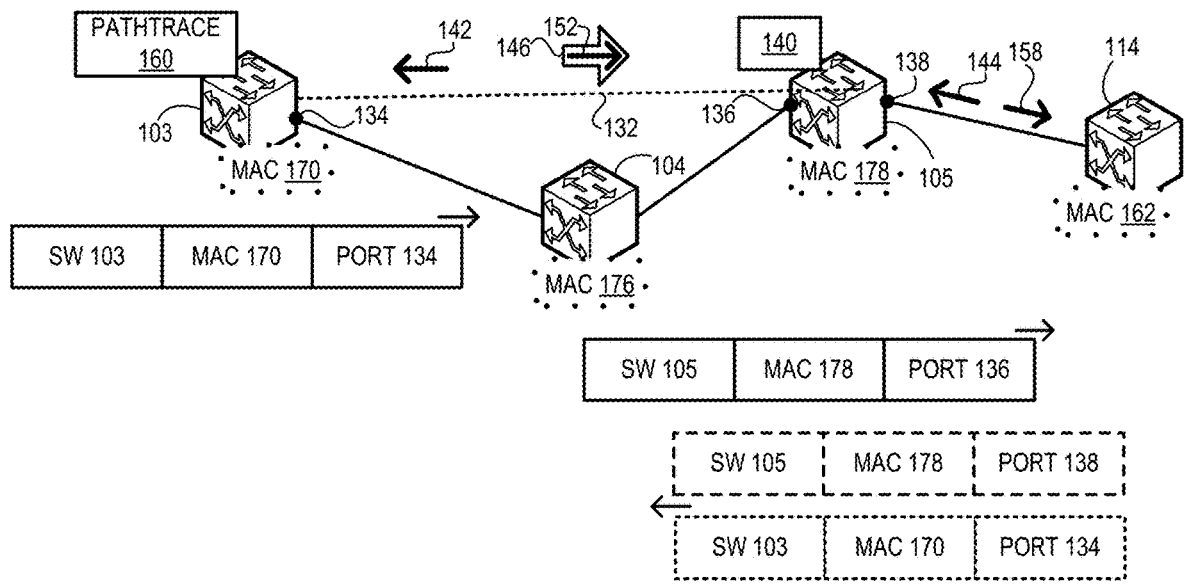

In FIG. 1, a respective link denoted with a dotted line in fabric 110 can be a tunnel. Switches of fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A respective link denoted with a solid line in fabric 110 can be a link in an underlying network (or an underlay network) 150 of fabric 110. Underlying network 150 can be a physical network, and a respective link of underlying network 150 can be a physical link. A VPN 130, such as an Ethernet VPN (EVPN), can be deployed over fabric 110. Fabric 110 can include a virtual gateway switch (VGS) 106 that can be coupled to an external switch 116 via a LAG 122. Here, LAG 122 can be a multi-chassis LAG and present the links between VGS 106 and switch 116 as an aggregated link.

Switches 102 and 105 can couple fabric 110 to an external network 120 via external switch 112. Switch 105 can also be coupled to an external switch 114. Furthermore, switches 101 and 102 can operate as a single switch in conjunction with each other to facilitate VGS 106. VGS 106 can be associated with one or more virtual addresses (e.g., a virtual IP address and/or a virtual MAC address). A respective tunnel formed at VGS 106 can use the virtual address to form the tunnel endpoint. To efficiently manage data forwarding, switches 101 and 102 can maintain an inter-switch link (ISL) 108 between them for sharing control and/or data packets. ISL 108 can be a layer-2 or layer-3 connection that allows data forwarding between switches 101 and 102. ISL 108 can also be based on a tunnel between switches 101 and 102 (e.g., a VXLAN tunnel).

Because the virtual address of VGS 106 is associated with both switches 101 and 102, other tunnel endpoints, such as switches 103, 104, and 105, of fabric 110 can consider VGS 106 as the other tunnel endpoint for a tunnel instead of switches 101 and 102. To forward traffic toward VGS 106 in fabric 110, a remote switch, such as switch 103, can operate as a tunnel endpoint while VGS 106 can be the other tunnel endpoint. From each of switches 103, 104, and 105, there can be a set of paths (e.g., equal-cost multiple paths or ECMP) to VGS 106. A respective path in underlying network 150 can lead to one of the participating switches of VGS 106. Hosts (or end devices) 124 and 126 can be coupled to switches 114 and 116, respectively. Furthermore, host 128 can be coupled to external network 120 via switch 118.

With existing technologies, layer-2 tracing in network 100 can be limited. Such tracing may not support layer-2 hops across a tunnel, such as tunnel 132, or a LAG, such as LAG 122. To address this limitation, a layer-3 mechanism, such as traceroute, may be applied on tunnel 132 by sending a packet with increasing TTL between switches 103 and 105. However, the packet may only trace hops in the underlying network 150 between switches 103 and 104, and switches 104 and 105. As a result, the extension of a layer-2 domain across tunnel 132 (e.g., using TNIs) may not be represented by the packet. In other words, the single layer-2 hop across tunnel 132 is not traced by the packet. Furthermore, some traceroute variants may provide layer-2 information of layer-3 hops based on their respective IP addresses (e.g., MAC addresses corresponding to IP addresses). However, the information collected by such a variant is limited to the layer-3 route taken by the packet in network 100.

To solve this problem, one or more devices in network 100 can support an instance of tracepath (e.g., a tracing daemon or a piece of hardware) that can facilitate efficient layer-2 path tracing in network 100 based on layer-2 addresses. For example, switch 103 can be equipped with a tracepath instance 160, which can also be referred to as tracepath 160. Tracepath 160 can send a layer-2 trace packet 152 that can accumulate information at a respective participating layer-2 hop on a forward path to a target device, such as switch 114. Tracepath 160 can then receive response trace packets 142 and 148 (or response packets 142 and 148) that can accumulate information on a reverse path from a respective participating device, such as switches 105 and 114, respectively.

Packet 152 can be carried via tunnel 132 based on an encapsulation header (e.g., a VXLAN header). To forward packet 152 toward switch 114 based on MAC address 162, switch 103 can encapsulate packet 152 with a tunnel header to generate encapsulated packet 146 and forward packet 146 via tunnel 132. Therefore, switch 104 can forward packet 146 without processing packet 152. As a result, MAC address 176 of switch 104 is not incorporated in packet 152. Upon receiving packet 146, switch 105 can decapsulate the encapsulation header to obtain packet 152. Consequently, tunnel 132 can be considered as a single layer-2 hop between switches 103 and 105.

Switch 105 can determine that packet 152 is a trace packet based on the packet type in the header of packet 152. Hence, even though packet 152 is destined to MAC address 162, which is not allocated to switch 105, switch 105 can process packet 152. For example, a tracepath instance 140 (e.g., a tracepath daemon) of switch 105 can listen on an internal interface (e.g., a software interface) running on the central processor of switch 105. Upon identifying the packet type, switch 105 may forward packet 152 to tracepath 140. Tracepath 140 can then append local trace information to the payload of packet 152 to generate packet 158 and provide packet 158 to the forwarding hardware of switch 105 without changing the source and destination addresses of packet 152. As a result, the packet type and the source and destination addresses of packets 152 and 158 can remain the same.

Switch 105 can append its local trace information to packet 152 on the forward path to generate updated packet 158. Switch 105 can generate a copy of packet 158 as response packet 142 and change the direction indicator to indicate a reverse trace to switch 103. Switch 105 can append its local trace information in response packet 142 in association with the reverse direction. In the same way, switch 114 can send a response packet 144 to switch 103. Switch 105 can also append its local trace information in the payload of response packet 144 in association with the reverse direction to generate packet 148. Switch 105 can decrement the TTL value in the header of packet 148 and send packet 148 to switch 103. In this way, tracepath 160 on switch 103 can obtain information from a respective participating layer-2 hop on both forward and reverse paths to and from switch 114, respectively.

In the same way, tracepath 160 can issue layer-2 trace packets 154 and 156 to accumulate layer-2 information for a respective layer-2 hop on a path to target switches 116 and 118, respectively. Layer-2 trace packets 152, 154, 156, and response packets 142, 144, and 148 can be Ethernet frames. Accordingly, trace packets 152, 154, 156, and response packets 142, 144, and 148 can be issued, forwarded, and responded to based on corresponding layer-2 addresses (e.g., MAC addresses).

For example, the source and destination addresses in the layer-2 header of packet 152 can correspond to MAC addresses 170 and 162 of originating switch 103 and target switch 114, respectively. Similarly, the source and destination addresses of packet 154 can correspond to MAC addresses 170 and 166 of switches 103 and 116, respectively. In the same way, the source and destination addresses of packet 156 can correspond to MAC addresses 170 and 164 of switches 103 and 118, respectively. On the other hand, the destination address in the layer-2 header of response packets 142, 144, and 148 can correspond to MAC address 170 of originating switch 103. The source address in the layer-2 header of response packet 142 can correspond to MAC address 178 of switch 105. On the other hand, the source address in the layer-2 header of response packets 144 and 148 can correspond to MAC address 162 of switch 114.

The layer-2 header of a respective trace packet, such as trace packet 152, can include a packet type indicating packet 152 to be a trace packet and a TTL value. If trace packet 152 is an Ethernet frame, the packet type can be indicated by the Ethertype field of the Ethernet header. Tracepath 160 can initialize the TTL value based on an initial TTL value, which can be predefined. The payload of packet 152 can include a direction indicator indicating forward trace from switch 103 to target switch 114. The payload can also include trace information of a respective participating device on the forward path in association with the forward direction. For example, the payload can accumulate trace information of switches 103, 105, and 114 in association with the forward direction.

Trace information associated with a participating device, such as switch 103, can include one or more of: a hostname of switch 103 (e.g., "switch 103", a port identifier of the egress port used for packet 152, and MAC address 179 of switch 103. Since packet 152 is encapsulated while forwarded over tunnel 132, switch 104 forwards the encapsulated packet to switch 105 without processing inner packet 152. As a result, packet 152 does not accumulate information associated with switch 104, thereby considering tunnel 132 as a single layer-2 hop.

In the same way, response packet 142 can accumulate trace information associated with a respective participating device on the reverse path from switch 105 to switch 103. Furthermore, response packet 144 can accumulate trace information associated with a respective participating device on the reverse path from switch 114 to switch 103. For example, switch 105 can append its local trace information in packet 144 to generate packet 148 and send packet 148 to switch 103. This allows switch 103 to receive a response packet from switches 105 and 114. Since packets 142 and 144 are generated from a copy of a corresponding trace packet at switches 105 and 114, respectively, packets 142 and 148 can also include the forward trace information up to switches 105 and 114, respectively.

Since packet 142 is from switch 105, packet 142 can include forward and reverse layer-2 trace information up to switch 105 in the layer-2 payload of response packet 142. On the other hand, since packet 144 is from switch 114 and packet 148 is generated from packet 144, packet 148 can include forward and reverse layer-2 trace information up to switch 114 in the layer-2 payload of response packet 148. It should be noted that tracepath 160 can be deployed using MAC addresses. Hence, tracepath 160 does not rely on any layer-3 based solutions (e.g., traceroute) and does not require looking up an ARP table for an IP address. Tracepath 160, therefore, can facilitate efficient layer-2 path tracing in heterogeneous network 100.

If, due to an issue in network 100, packet 158 is dropped due to an expired TTL, a TTL expired message is sent back to switch 103 indicating that the TTL value has reached an expiration value (e.g., a value of zero) at an expiration hop. The payload of the TTL expired message can include the forward trace information up to the expirateion hop. The TTL value in the payload of the TTL expired message can be reset to the initial value or the TTL value from packet 158. The TTL expired message may accumulate reverse trace information at a respective layer-2 hop from the drop location to switch 103. As a result, a TTL expired message can include forward and reverse trace information up to the expiration hop. The expiration hop can indicate the layer-2 hop where the TTL value has reached the expiration value.

FIG. 1B illustrates an example of a layer-2 path tracing packet, in accordance with an aspect of the present application. A trace or response packet 180 can include a layer-2 header 182 and a layer-2 payload 184. Header 182 can include one or more of: a packet type 192, a source address 194, a destination address 196, and a TTL 198. If header 182 is an Ethernet header, type 192 can be the Ethertype field of the Ethernet header, and source and destination addresses 194 and 196 can be MAC addresses. A respective intermediate participating device can determine that packet 180 is a trace packet based on type 192 in header 182 of packet 180. Hence, even though packet 180 can be destined to a destination address 196, which may not be allocated to the local device, the intermediate participating device can process packet 180 without changing source and destination addresses 192 and 196, respectively.

Furthermore, payload 184 can include trace information 190 of a respective forward and reverse hop between the originating and target devices. Payload 184 can include trace information 190 in association with direction 191. For example, if a device includes information 190 on the forward path, direction 191 can indicate the forward direction. On the other hand, the same device can include information 190 on the reverse path, and direction 191 can indicate the reverse direction. Direction 191 can be indicated based on a value (e.g., "0" or "1") or a set of characters (e.g., "forward" or "reverse") in payload 184. A tracepath instance, such as tracepath 160 on switch 103 or tracepath 140 on switch 105, can determine direction 191 based on a direction indicator 188, which can be a field of header 182 or a value in payload 184. Direction indicator 188 can be represented as a Boolean value.

Payload 184 can be represented based on a dictionary data structure. Packet 180 can then have metadata in payload 184 represented as a dictionary with an index as "forward" or "reverse," and values as a list representing trace information 190. Trace information 190 associated with a device can include one or more of: a hostname of the device, the layer-2 address of the device, and a port identifier of the port used for packet 180. Consequently, the list can be in the form of ['host name,' 'MAC address,' 'port identifier']. For example, the dictionary entry generated by switch 103 can be {'forward': [['switch 103', 'MAC address 170', 'port 134']]}.

When trace or response packet 180 travels via a tunnel (e.g., tunnel 132), packet 180 can be encapsulated with a tunnel encapsulation header 186 (e.g., a VXLAN header). The layer-3 source and destination addresses, such as IP addresses, of header 186 can correspond to the endpoints of the tunnel. For example, if packet 180 corresponds to packet 152, the encapsulated packet can correspond to packet 146. The source and destination IP addresses of header 186 can then be the IP addresses of switches 103 and 105, respectively.

When tracepath 160 sends trace packet 152, tracepath 160 can include trace information associated with switch 103 in the payload of packet 152 and forward packet 152 via port 134 of switch 103. The trace information associated with switch 103 can include a hostname of switch 103 (e.g., "switch 103"), MAC address 170, and the identifier of port 134. Since packet 146 forwarded via tunnel 132, switch 104 does not process inner packet 152 and hence, does not append local trace information in packet 152. Switch 105 can receive packet 146 via port 136 of switch 105 and obtain packet 152 from packet 146.

Since switch 105 is an intermediate switch on the path to switch 114, tracepath 140 on switch 105 can append the local trace information in the payload of packet 152 in association with the forward direction (e.g., direction 191 in packet 180) and generate packet 158. The generation of packet 158 allows the accumulation of trace information at a respective participating layer-2 hop on the forward path from switch 103 to switch 114. The trace information associated with switch 105 can include a hostname of switch 105 (e.g., "switch 105"), MAC address 178, and the identifier of port 136. The dictionary in packet 158 can be {'forward': [['switch 103', 'MAC address 170', 'port 134'], ['switch 105', 'MAC address 178', 'port 136']]}. Tracepath 140 can decrement the TTL value in the header of packet 158 and forward packet 158 to switch 114, which can be the next layer-2 hop, based on the destination address (i.e., MAC address 162) of packet 158. Here, the destination address for packets 152 and 158 remain the same even though packet 152 is processed at a layer-2 hop at switch 105.

This process of appending trace information is performed by a respective participating device on the path to switch 114. When switch 114 receives packet 158, upon appending the local trace information, switch 114 can terminate the forward trace. Tracepath 140 can also generate response packet 142 by copying packet 158 and changing the direction indicator (e.g., indicator 188 in packet 180) to indicate a reverse trace to switch 103. For example, tracepath 140 may change the Boolean value of the direction indicator. Tracepath 140 can include reverse trace information in the payload of packet 142 in association with the reverse direction.

However, since packet 152 is received via tunnel 132, tracepath 140 may include trace information associated with switch 103 (denoted with dotted lines) in packet 142. Such information can include a hostname of switch 103 (e.g., "switch 103"), MAC address 170, and the identifier of port 134. Tracepath 140 can also reset the TTL value in the header of packet 142 to a predetermined initial value or the TTL value from packet 152 based on a TTL selection policy. Switch 105 can then send packet 142 to switch 103. The dictionary in packet 142 can be {'forward': [['switch 103', 'MAC address 170', 'port 134'], ['switch 105', 'MAC address 178', 'port 136']]}; {'reverse': [['switch 103', 'MAC address 170', 'port 134']]}.

In the same way, switch 105 can receive a response packet 144 from switch 114 via port 138 of switch 105. Tracepath 140 can then append reverse trace information associated with switch 105 (denoted with dashed lines) in packet 144 to generate packet 148. Such information can include a hostname of switch 105 (e.g., "switch 105"), MAC address 178, and the identifier of port 138. The generation of packet 148 allows the accumulation of trace information at a respective participating layer-2 hop on the reverse path from switch 114 to switch 103. Tracepath 140 can decrement the TTL value in the header of packet 148. Switch 105 can then send packet 148 to switch 103.

Since packet 144 is received from switch 114 and packet 148 is generated from packet 144, packet 148 can include forward and reverse trace information up to switch 114. Here, the destination address for packets 144 and 144 can remain the same even though packet 144 is processed at a layer-2 hop at switch 105. This process of appending trace information is performed by a respective participating device on the path to switch 103. When switch 103 receives packet 148, upon appending the local trace information, tracepath 160 can terminate the reverse trace.

Figure 2A:
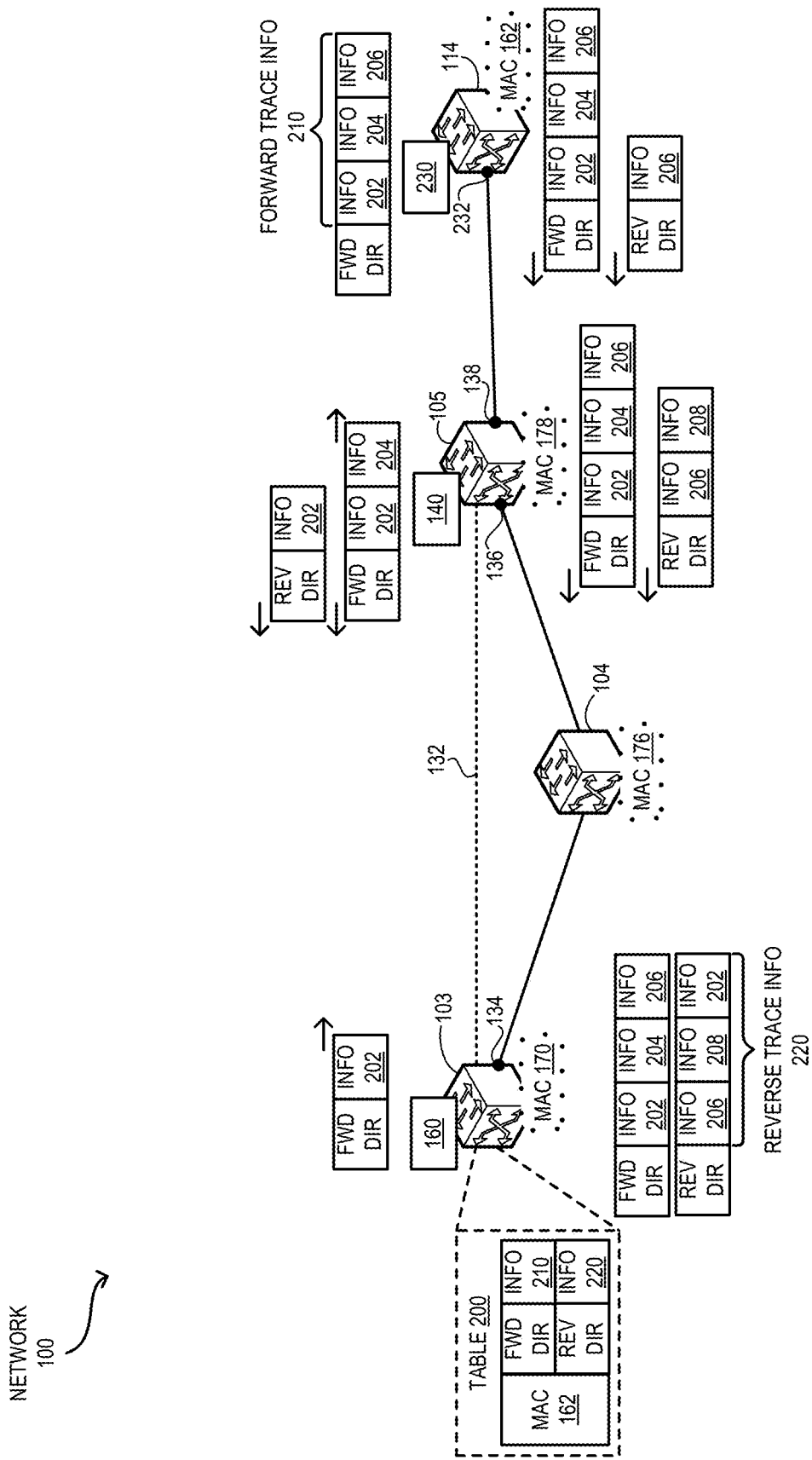
FIG. 2A illustrates an example of layer-2 path tracing across a tunnel, in accordance with an aspect of the present application.

FIG. 2A illustrates an example of layer-2 path tracing across a tunnel, in accordance with an aspect of the present application. During operation, switch 103 may attempt to locate the device with MAC address 162 (i.e., switch 114) in network 100. Switch 103 may receive an instruction to initiate the trace from a management device or an administrator. The management device may configure, monitor, and/or control one or more devices in network 100. Switch 103 may receive the instruction in the form of a script, a remote command, or a command-line interface (CLI) command. Switch 103 may learn MAC address 162 from tunnel 132. As a result, switch 103 may store MAC address 162 in association with tunnel 132 in a local layer-2 forwarding table. Similarly, switch 105 may learn MAC address 162 from port 138 and store it in association with port 138 in a local forwarding table.

To initiate layer-2 path tracing to switch 114, tracepath 160 can generate a layer-2 trace packet with a layer-2 header. The packet type in the layer-2 header can indicate the packet to be a trace packet. The source and destination addresses of the layer-2 header can correspond to MAC addresses 170 and 162, respectively. The TTL value of the header can be set to a predetermined initial value. Tracepath 160 can include local trace information 202 in association with the forward direction in the payload of the trace packet. Information 202 can include ['switch 103', 'MAC address 170', 'port 134']. Hence, the dictionary in the trace packet can be {'forward': [information 202]}. Based on the local forwarding table entry corresponding to MAC address 162, switch 103 can send the trace packet via tunnel 132 by encapsulating the packet with an encapsulation header.

Since switch 105 is the remote endpoint of tunnel 132 and is reachable via port 134, switch 103 can send the encapsulated packet via port 134 to switch 104. Based on the encapsulation header, switch 104 can the encapsulated packet to switch 103 without processing the inner trace packet. Upon receiving the encapsulated packet via port 136, switch 105 can remove the encapsulation header and obtain the inner trace packet. Switch 105 can provide the trace packet to tracepath 140 on switch 105 based on the packet type. Tracepath 140 can decrement the TTL value in the header and append trace information 204 in association with the forward direction in the payload of the trace packet. Information 204 can include ['switch 105', 'MAC address 178', 'port 136']. Hence, the dictionary in the trace packet can be {'forward': [information 202, information 204]}. Based on the local forwarding table, switch 105 can send the trace packet via port 138 without changing the source and destination addresses.

Tracepath 140 can also generate a response packet from the trace packet. Tracepath 140 can change the direction indicator to indicate a reverse trace to switch 103. Hence, the source and destination addresses of the response packet can correspond to MAC addresses 178 and 170, respectively. Tracepath 140 can append trace information 202 in association with the reverse direction in the payload of the response packet. Hence, the dictionary in the response packet can be {'forward': [information 202, information 204]}; {'reverse': [information 202]}. Based on the local forwarding table, switch 105 can send the response packet via port 136.

Upon receiving the trace packet via port 232, switch 114 can provide the trace packet to tracepath 230 on switch 114 based on the packet type. Tracepath 230 can append trace information 206 in association with the forward direction in the payload of the trace packet. Information 206 can include ['switch 114', 'MAC address 162', 'port 232']. Since the destination MAC address 162 of the trace packet is a local address (i.e., allocated to switch 114), tracepath 230 can terminate the forwarding of the trace packet. Tracepath 230 can then generate a response packet from the trace packet. Tracepath 230 can reset the TTL value and change the direction indicator to indicate a reverse trace in the header of the response packet. The source and destination addresses of the response packet can then correspond to MAC addresses 162 and 170, respectively.

Tracepath 230 can append trace information 206 in association with the reverse direction in the payload of the response packet. Hence, the dictionary in the response packet can be {'forward': [information 202, information 204, information 206]}; {'reverse': [information 206]}. Here, [information 202, information 204, information 206] can represent forward trace information 210. Based on the local forwarding table, switch 114 can send the response packet via port 232. Upon receiving the response packet via port 138, switch 105 can provide the response packet to tracepath 140 based on the packet type. Tracepath 140 can decrement the TTL value in the header and append trace information 208 in association with the reverse direction in the payload of the response packet. Information 208 can include ['switch 105', 'MAC address 178', 'port 138']. Hence, the dictionary in the response packet can be {'forward': [information 202, information 204, information 206]}; {'reverse': [information 206, information 208]}. Based on the local forwarding table, switch 105 can encapsulate the response packet and send the encapsulated packet via tunnel 132 to switch 103.

Upon receiving the encapsulated packet via port 134, switch 103 can remove the encapsulation header and obtain the inner response packet. Switch 103 can provide the response packet to tracepath 160 based on the packet type. Tracepath 160 can append trace information 202 in association with the reverse direction in the payload of the response packet. Hence, the dictionary in the response packet can be {'forward': [information 202, information 204, information 206]}; {'reverse': [information 206, information 208, information 202]}. Here, [information 206, information 208, information 202] can represent reverse trace information 220. Since destination MAC address 170 of the response packet is a local address, tracepath 160 can terminate the forwarding of the response packet. Tracepath 160 may store forward trace information 210 and reverse trace information 220 in association with MAC address 162 in a trace table 200. Tracepath 160 may also provide the information to a device that may display the information.

Figure 2B:
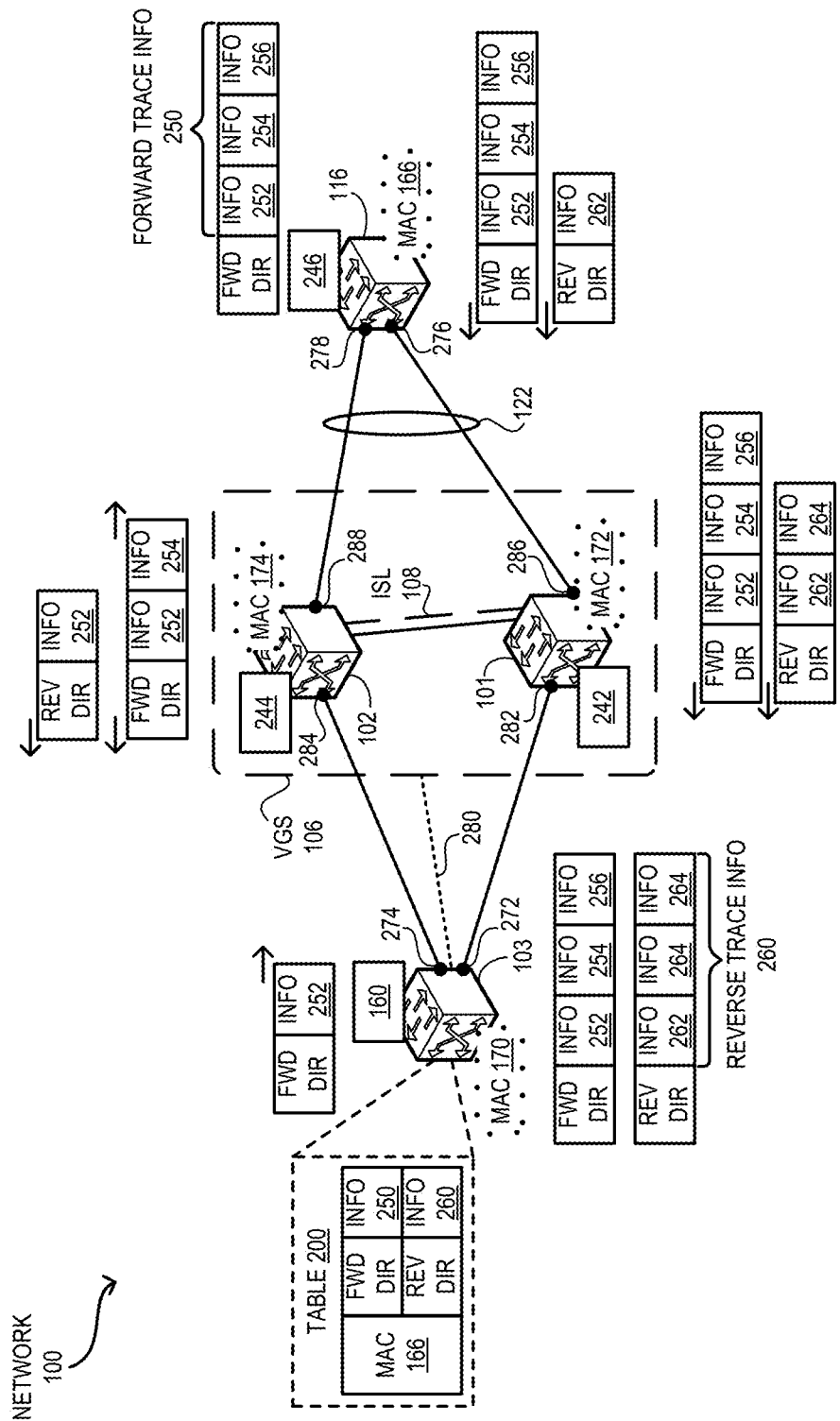
FIG. 2B illustrates an example of layer-2 path tracing across a virtual gateway switch (VGS) of a distributed tunnel fabric, in accordance with an aspect of the present application.

FIG. 2B illustrates an example of layer-2 path tracing across a VGS of a distributed tunnel fabric, in accordance with an aspect of the present application. Since VGS 106 is a virtual gateway, VGS 106 can be associated with a virtual address (e.g., a virtual IP address) shared by switches 101 and 102. Hence, tunnel 280 between switch 103 and VGS 106 can be established based on the IP address of switch 103 and the virtual IP address of VGS 106. As a result, packets forwarded to the virtual IP address via tunnel 280 may take any of the paths in underlying network 150 that can lead to one of the participating switches of VGS 106. In other words, if switch 103 sends a packet via tunnel 280, that packet may be forwarded to switch 101 via port 272 or switch 102 via port 274 based on a selection policy for a VGS (e.g., based on round-robin distribution, load balancing, or bandwidth utilization).

Furthermore, switch 116 can be coupled to switches 101 and 102 via a LAG 122. Hence, the links in LAG 122 can be considered as an aggregated link. As a result, switch 116 may receive packets from switches 101 and 102. On the other hand, to forward packets via LAG 122, switch 116 may select one of switches 101 and 102 as the destination. Switch 116 may select a particular link or switch of LAG 122 for sending all traffic belonging to a data flow indicated a source and destination address pair. Switch 116 may also select a link or switch of LAG 122 for sending individual packets. For example, when switch 116 sends a packet via LAG, that packet may be forwarded to switch 101 via port 276 or switch 102 via port 278 based on a selection policy for a LAG (e.g., based on round-robin distribution, load balancing, or bandwidth utilization).

During operation, switch 103 may attempt to locate the device with MAC address 166 (i.e., switch 116) in network 100. Switch 103 may learn MAC address 166 from tunnel 280. As a result, switch 103 may store MAC address 166 in association with tunnel 280 in a local layer-2 forwarding table. To initiate layer-2 path tracing to switch 116, tracepath 160 can generate a layer-2 trace packet with a layer-2 header. The source and destination addresses of the layer-2 header can correspond to MAC addresses 170 and 166, respectively. The TTL value of the header can be set to a predetermined initial value. To forward the trace packet, switch 103 can select one of ports 272 and 274 as an egress port. Suppose that the selection policy selects switch 102 as the destination switch associated with tunnel 280. Hence, switch 103 can select 274 as the egress port.

Tracepath 160 can then include local trace information 252 in association with the forward direction in the payload of the trace packet. Information 252 can include ['switch 103', 'MAC address 170', 'port 274']. The dictionary in the trace packet can then be {'forward': [information 252]}. Based on the local forwarding table, switch 103 can send the packet via tunnel 280 by encapsulating the packet with an encapsulation header. The source and destination addresses of the encapsulation header can be the IP address of switch 103 and the virtual IP address of VGS 106. Since VGS 106 is the remote endpoint of tunnel 280 and the egress port is port 274, the trace packet is forwarded to switch 102.

Upon receiving the encapsulated packet via port 284, switch 102 can remove the encapsulation header and obtain the inner trace packet. Switch 102 can provide the trace packet to tracepath 244 on switch 102 based on the packet type. Tracepath 244 can decrement the TTL value in the header and append trace information 254 in association with the forward direction in the payload of the trace packet. Information 254 can include ['switch 102', 'MAC address 174', 'port 284']. Hence, the dictionary in the trace packet can be {'forward': [information 252, information 254]}. Based on the local forwarding table, switch 102 can send the trace packet via port 288 without changing the source and destination addresses.

Tracepath 244 can also generate a response packet from the trace packet. Tracepath 244 can change the direction indicator to indicate a reverse trace to switch 103. Hence, the source and destination addresses of the response packet can correspond to MAC addresses 174 and 170, respectively. Tracepath 244 can append trace information 252 in association with the reverse direction in the payload of the response packet. Hence, the dictionary in the response packet can be {'forward': [information 252, information 254]}; {'reverse': [information 252]}. Based on the local forwarding table, switch 102 can send the response packet via port 284.

Upon receiving the trace packet via port 278, switch 116 can provide the trace packet to tracepath 246 on switch 116 based on the packet type. Tracepath 246 can append trace information 256 in association with the forward direction in the payload of the trace packet. Information 256 can include ['switch 116', 'MAC address 166', 'port 278']. Since destination MAC address 166 of the trace packet is a local address, tracepath 246 can terminate the forwarding of the trace packet. Tracepath 246 can then generate a response packet from the trace packet. Tracepath 246 can reset the TTL value and change the direction indicator to indicate a reverse trace in the header of the response packet. The source and destination addresses of the response packet can then correspond to MAC addresses 166 and 170, respectively.

Since the next-hop switch is VGS 106, switch 116 may select one of ports 276 and 278 leading to switches 101 and 102, respectively, as the egress port. Suppose that switch 116 selects port 276 as the egress port for forwarding via LAG 122. Accordingly, tracepath 246 can append corresponding trace information 262 in association with the reverse direction in the payload of the response packet. Information 262 can include ['switch 116', 'MAC address 166', 'port 276']. Hence, the dictionary in the response packet can be {'forward': [information 252, information 254, information 256]}; {'reverse': [information 262]}. Here, [information 252, information 254, information 256] can represent forward trace information 250. Switch 116 can then forward the response packet to switch 101 via port 276.

Upon receiving the response packet via port 286, switch 101 can provide the response packet to tracepath 242 based on the packet type. Tracepath 242 can decrement the TTL value in the header and append trace information 264 in association with the reverse direction in the payload of the response packet. Information 264 can include ['switch 101', 'MAC address 172', 'port 286']. Hence, the dictionary in the response packet can be {'forward': [information 252, information 254, information 256]}; {'reverse': [information 262, information 264]}. Based on the local forwarding table, switch 105 can encapsulate the response packet and send the encapsulated packet via tunnel 280 to switch 103.

Upon receiving the encapsulated packet via port 272, switch 103 can remove the encapsulation header and obtain the inner response packet. Switch 103 can provide the response packet to tracepath 160 based on the packet type. Tracepath 160 can append trace information 266 in association with the reverse direction in the payload of the response packet. Information 266 can include ['switch 103', 'MAC address 170', 'port 272']. Hence, the dictionary in the response packet can be {'forward': [information 252, information 254, information 256]}; {'reverse': [information 262, information 264, information 266]}. Here, [information 262, information 264, information 266] can represent reverse trace information 260. Since destination MAC address 170 of the response packet is a local address, tracepath 160 can terminate the forwarding of the response packet. Tracepath 160 may store forward trace information 250 and reverse trace information 260 in association with MAC address 166 in trace table 220.

Figure 3A:
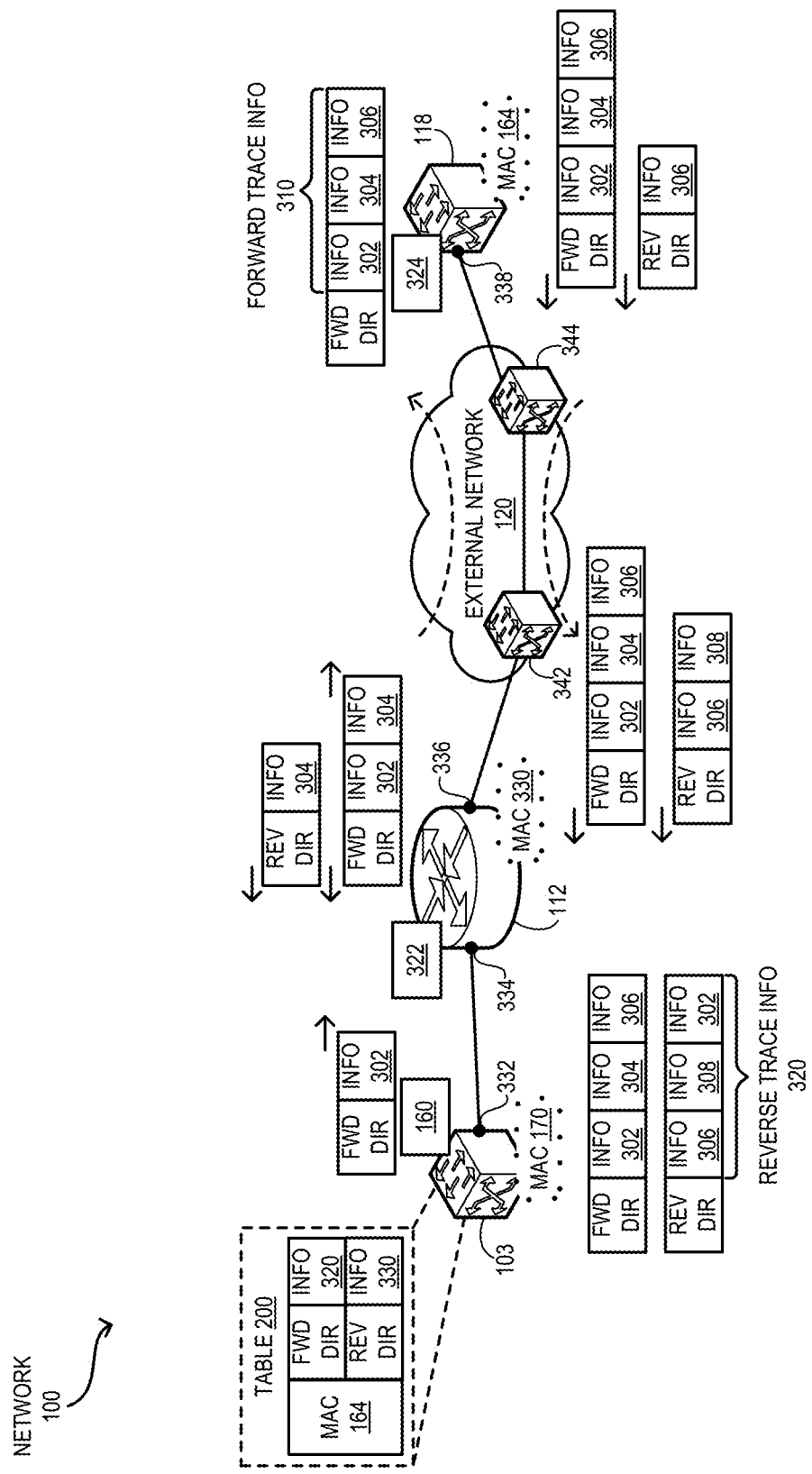
FIG. 3A illustrates an example of layer-2 path tracing for a path with switches without support, in accordance with an aspect of the present application.

FIG. 3A illustrates an example of layer-2 path tracing for a path with switches without support, in accordance with an aspect of the present application. During operation, switch 103 may attempt to locate the device with MAC address 164 (i.e., switch 118) in network 100. Switch 103 may learn MAC address 166 from port 332 coupling switch 112. As a result, switch 103 may store MAC address 166 in association with port 332 in a local layer-2 forwarding table. To do so, tracepath 160 can generate a layer-2 trace packet with a layer-2 header. The packet type in the layer-2 header can indicate the packet to be a trace packet. The source and destination addresses of the layer-2 header can correspond to MAC addresses 170 and 164, respectively. The TTL value of the header can be set to a predetermined initial value.

The next layer-2 hop for the trace packet, switch 112, can be reachable via port 332. Tracepath 160 can include local trace information 302 in association with the forward direction in the payload of the trace packet. Information 302 can include ['switch 103', 'MAC address 170', 'port 332']. Hence, the dictionary in the trace packet can be {'forward': [information 302]}. Based on the local forwarding table entry corresponding to MAC address 162, switch 103 can send the trace packet via port 332 to switch 112.

Upon receiving the trace packet via port 334, switch 112 can provide the trace packet to tracepath 322 on switch 112 based on the packet type. Tracepath 322 can decrement the TTL value in the header and append trace information 304 in association with the forward direction in the payload of the trace packet. Information 304 can include ['switch 112', 'MAC address 330', 'port 334']. Hence, the dictionary in the trace packet can be {'forward': [information 302, information 304]}. Based on the local forwarding table, switch 112 can send the trace packet via port 336 without changing the source and destination addresses.

Tracepath 322 can also generate a response packet from the trace packet. Tracepath 322 can change the direction indicator to indicate a reverse trace to switch 103. Hence, the source and destination addresses of the response packet can correspond to MAC addresses 330 and 170, respectively. Tracepath 322 can append trace information 304 in association with the reverse direction in the payload of the response packet. Hence, the dictionary in the response packet can be {'forward': [information 302, information 304]}; {'reverse': [information 304]}. Based on the local forwarding table, switch 112 can determine that MAC address 170 is reachable via port 334. Switch 112 can then forward the response packet via port 334 to switch 103.

However, switch 342, as well as switch 344, in external network 120 can be intermediate switches on a path to switch 118 but may not support layer-2 packet tracing. For example, packet tracing can be specific to a virtual local area network (VLAN). The trace and response packets can then belong to a particular VLAN. Consequently, the switches that are configured with the VLAN can participate in the layer-2 packet tracing process. If switches 342 and 344 are not configured with the VLAN for which the packet tracing is initiated, switches 342 and 344 may not participate in the packet tracing even if tracepath is locally supported. In other words, a respective traced switch may belong to the VLAN.

On the other hand, if tracepath is not supported in switches 342 and 344, switch 342 may not recognize the trace packet as a layer-2 trace packet based on the packet type. Since destination MAC address 164 is not a local address, switch 342 can forward the trace packet to next-hop switch 344. In the same way, switch 344 can forward the trace packet to next-hop switch 118 based on destination MAC address 164 of the trace packet. In this way, even if a switch does not support tracepath, the tracing process can continue to subsequent hops. Since switches 342 and 344 do not process the trace packet (denoted with dashed arrows), the TTL value may not be decremented for the corresponding layer-2 hops.

Switch 118 can receive the trace packet via port 338 and provide the trace packet to tracepath 324 on switch 118 based on the packet type. Tracepath 324 can append trace information 306 in association with the forward direction in the payload of the trace packet. Information 306 can include ['switch 118', 'MAC address 164', 'port 338']. Since destination MAC address 162 of the trace packet is a local address, tracepath 324 can terminate the forwarding of the trace packet. Tracepath 324 can then generate a response packet from the trace packet. Tracepath 324 can reset the TTL value and change the direction indicator to indicate a reverse trace in the header of the response packet. The source and destination addresses of the response packet can then correspond to MAC addresses 164 and 170, respectively.

Tracepath 324 can append trace information 306 in association with the reverse direction in the payload of the response packet. Hence, the dictionary in the response packet can be {'forward': [information 302, information 304, information 306]}; {'reverse': [information 306]}. Here, [information 302, information 304, information 306] can represent forward trace information 310. Based on the local forwarding table, switch 118 can send the response packet via port 338. Switches 342 and 344 can forward the trace packet via external network 120 based on destination MAC address 170 of the response packet.

Upon receiving the response packet via port 336, switch 112 can provide the response packet to tracepath 322 based on the packet type. Tracepath 322 can decrement the TTL value in the header and append trace information 308 in association with the reverse direction in the payload of the response packet. Information 308 can include ['switch 112', 'MAC address 330', 'port 336']. Hence, the dictionary in the response packet can be {'forward': [information 302, information 304, information 306]}; {'reverse': [information 306, information 308]}. Based on the local forwarding table, switch 112 can send the response packet to switch 103 via port 334.

Switch 103 can receive the response packet via port 332 and provide the response packet to tracepath 160 based on the packet type. Tracepath 160 can append trace information 302 in association with the reverse direction in the payload of the response packet. Hence, the dictionary in the response packet can be {'forward': [information 302, information 304, information 306]}; {'reverse': [information 306, information 308, information 302]}. Here, [information 306, information 308, information 302] can represent reverse trace information 320. Since destination MAC address 170 of the response packet is a local address, tracepath 160 can terminate the forwarding of the response packet. Tracepath 160 may store forward trace information 310 and reverse trace information 320 in association with MAC address 164 in trace table 200.

Figure 3B:
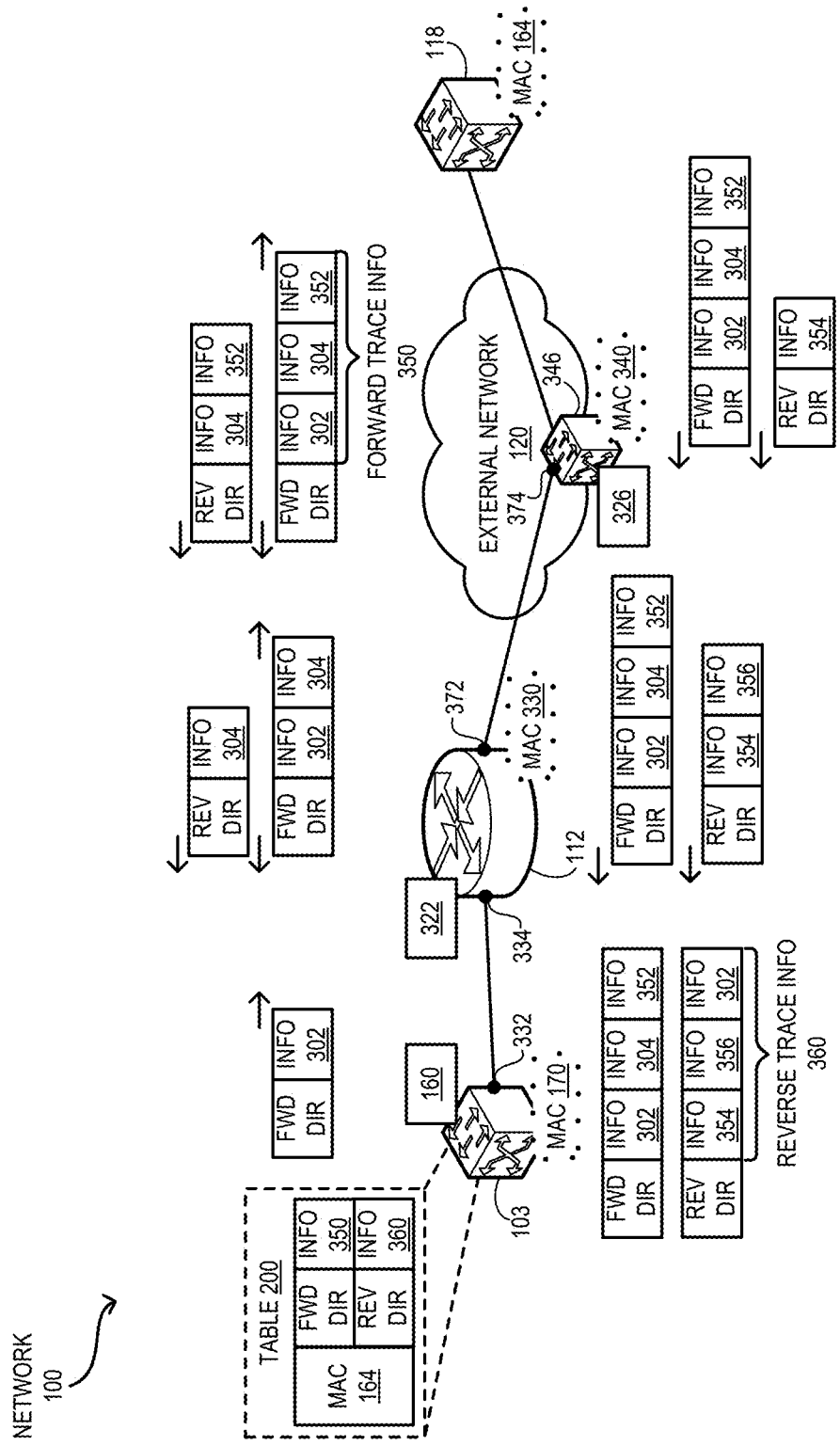
FIG. 3B illustrates an example of layer-2 path tracing to a target switch without support, in accordance with an aspect of the present application.

FIG. 3B illustrates an example of layer-2 path tracing to a target switch without support, in accordance with an aspect of the present application. In this example, target switch 118 may not support tracepath. However, a switch 346, which can be on the path to switch 118 in external network 120, can support tracepath. As a result, switch 112 can forward the trace packet, which is directed to switch 118, to switch 346 via port 372. Here, the dictionary in the trace packet from switch 112 can be {'forward': [information 302, information 304]}. Furthermore, the dictionary in the response packet can be {'forward': [information 302, information 304]}; {'reverse': [information 302]}, as described in conjunction with FIG. 3A.

Upon receiving the trace packet via port 374, switch 346 can provide the trace packet to tracepath 326 on switch 346 based on the packet type. Tracepath 326 can decrement the TTL value in the header and append trace information 352 in association with the forward direction in the payload of the trace packet. Information 352 can include ['switch 346', 'MAC address 340', 'port 374']. Hence, the dictionary in the trace packet can be {'forward': [information 302, information 304, information 352]}. Based on the local forwarding table, switch 112 can send the trace packet to switch 118. However, since switch 118 does not support tracepath, switch 118 may not provide a response.

Tracepath 326 can also generate a response packet from the trace packet. Tracepath 326 can change the direction indicator to indicate a reverse trace to switch 103. Hence, the source and destination addresses of the response packet can correspond to MAC addresses 340 and 170, respectively. Tracepath 326 can append trace information 352 in association with the reverse direction in the payload of the response packet. Hence, the dictionary in the response packet can be {'forward': [information 302, information 304, information 352]}; {'reverse': [information 352]}. Based on the local forwarding table, switch 346 can determine that MAC address 170 is reachable via port 374. Switch 346 can then forward the response packet via port 374 to switch 112.

Switch 112 can receive the response packet via port 372 and provide the response packet to tracepath 322 based on the packet type. Tracepath 322 can decrement the TTL value in the header and append trace information 356 in association with the reverse direction in the payload of the response packet. Information 356 can include ['switch 112', 'MAC address 330', 'port 372']. Hence, the dictionary in the response packet can be {'forward': [information 302, information 304, information 352]}; {'reverse': [information 354, information 356]}. Based on the local forwarding table, switch 112 can send the response packet to switch 103 via port 334.

Switch 103 can receive the response packet via port 332 and provide the response packet to tracepath 160 based on the packet type. Tracepath 160 can append trace information 302 in association with the reverse direction in the payload of the response packet. Hence, the dictionary in the response packet can be {'forward': [information 302, information 304, information 352]}; {'reverse': [information 354, information 356, information 302]}. Here, [information 354, information 356, information 302] can represent reverse trace information 360. Moreover, since switch 118 may not participate in the tracing process, [information 302, information 304, information 352] can represent forward trace information 350 and can indicate the traced segment of the path to switch 118.

Since destination MAC address 170 of the response packet is a local address, tracepath 160 can terminate the forwarding of the response packet. If no response packet from switch 118 is received by switch 103, tracepath 160 may re-issue the trace packet for switch 118 for a predetermined number of times. If no response packet from switch 118 is received after the retries, tracepath 160 may determine that switch 118 (i.e., the device associated with MAC address 164) does not support tracepath. Tracepath 160 can then consider forward trace information 350 and reverse trace information 360 as the final trace for MAC address 164. Tracepath 160 may then store forward trace information 350 and reverse trace information 360 in association with MAC address 164 in trace table 200.

Figure 4A:
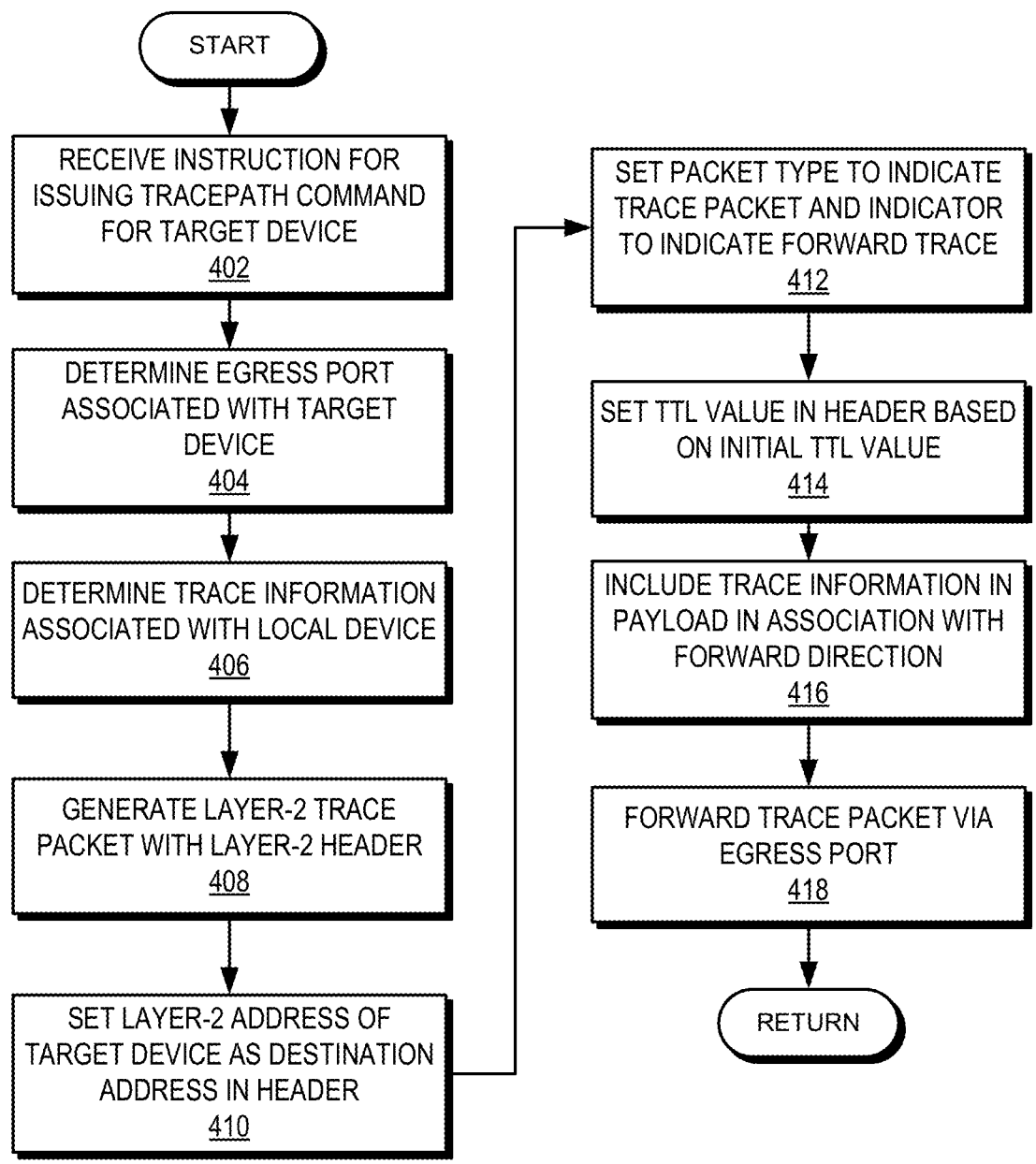
FIG. 4A presents a flowchart illustrating the process of an originating device issuing a layer-2 path tracing packet, in accordance with an aspect of the present application.

FIG. 4A presents a flowchart illustrating the process of an originating device issuing a layer-2 path tracing packet, in accordance with an aspect of the present application. During operation, the device may receive an instruction for issuing a tracepath command for a target device (operation 402). The device can determine an egress port associated with the target device (operation 404) and determine trace information associated with the local device (operation 406). The trace information can include a hostname, a MAC address, and an identifier of a port associated with a trace packet. The device can then generate a layer-2 trace packet with a layer-2 header (operation 408) and set a layer-2 address of the target device as the destination address in the header (operation 410).

The device can then set the packet type to indicate a trace packet and set an indicator to indicate a forward trace (operation 412). The device can also set the TTL value in the header based on an initial TTL value (operation 414). The initial TTL can be predetermined (e.g., based on a default or configured value). The device can then include the trace information in the payload in association with the forward direction (operation 416). The trace information can include the trace information in a dictionary data structure with an index indicating "forward." The device can then forward the trace packet via the egress port (operation 418).

Figure 4B:
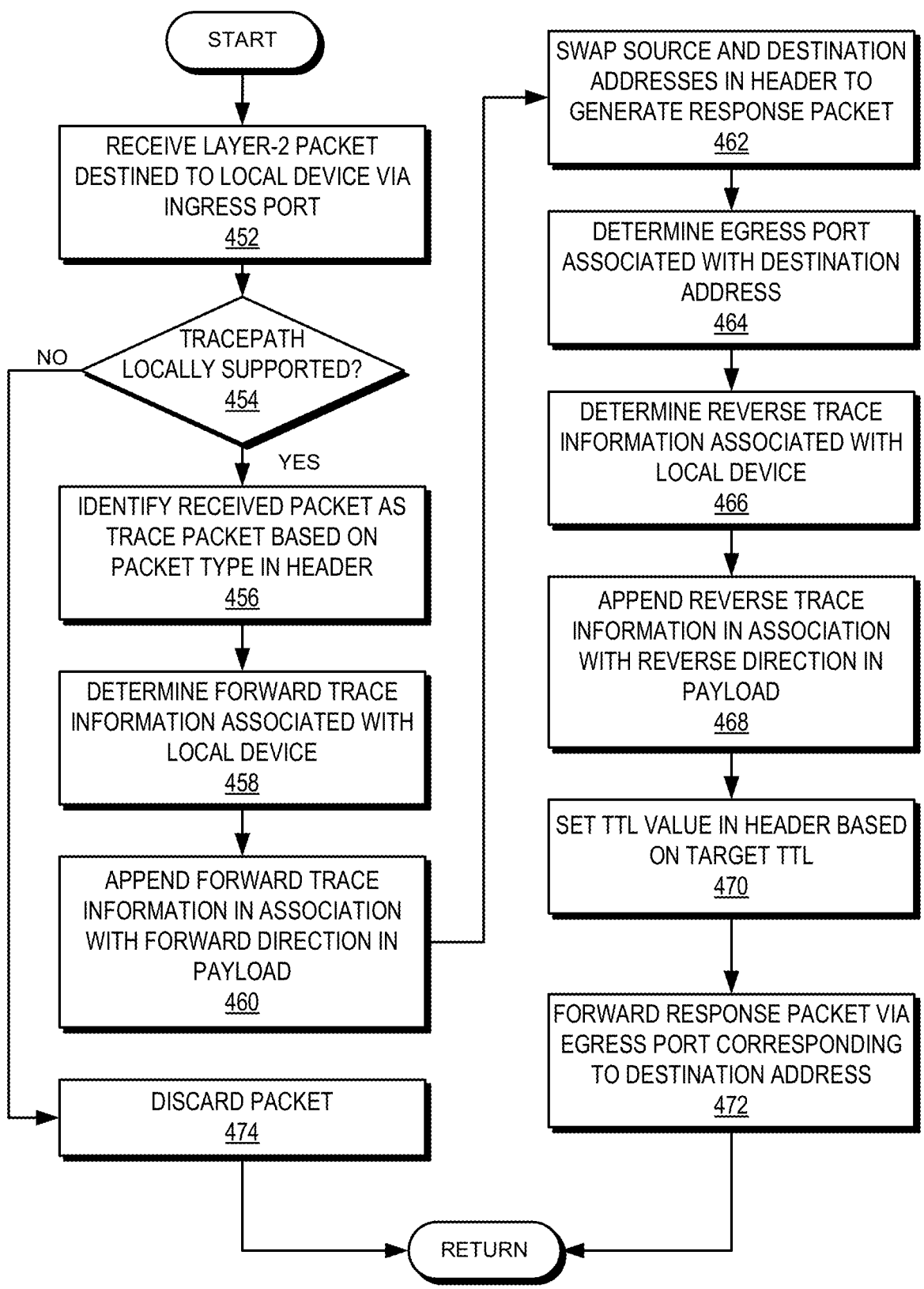
FIG. 4B presents a flowchart illustrating the process of a target device processing a layer-2 path tracing packet, in accordance with an aspect of the present application.

FIG. 4B presents a flowchart illustrating the process of a target device processing a layer-2 path tracing packet, in accordance with an aspect of the present application. During operation, the device may receive a layer-2 trace packet destined to the local device via an ingress port (operation 452). The device can then determine whether tracepath is locally supported by the device (operation 454). If tracepath is not locally supported, the device can discard the packet (operation 474). On the other hand, if tracepath is locally supported, the device can identify the received packet as a trace packet based on the packet type in the header (operation 456) and determine the forward trace information associated with the local device (operation 458). The device can then append the forward trace information in association with the forward direction in the payload (operation 460).

Subsequently, the device can swap the source and destination addresses in the header to generate a response packet (operation 462). The device can determine an egress port associated with the destination address (operation 464) and determine reverse trace information associated with the local device (operation 466). The forward and reverse trace information can be the trace information for the forward and reverse trace paths, respectively. The device can then append the reverse trace information in association with the reverse direction in the payload (operation 468). The device can set the TTL value in the header based on an initial TTL value (operation 470). The device can then forward the response packet via the egress port corresponding to the destination address (operation 472).

Figure 5:
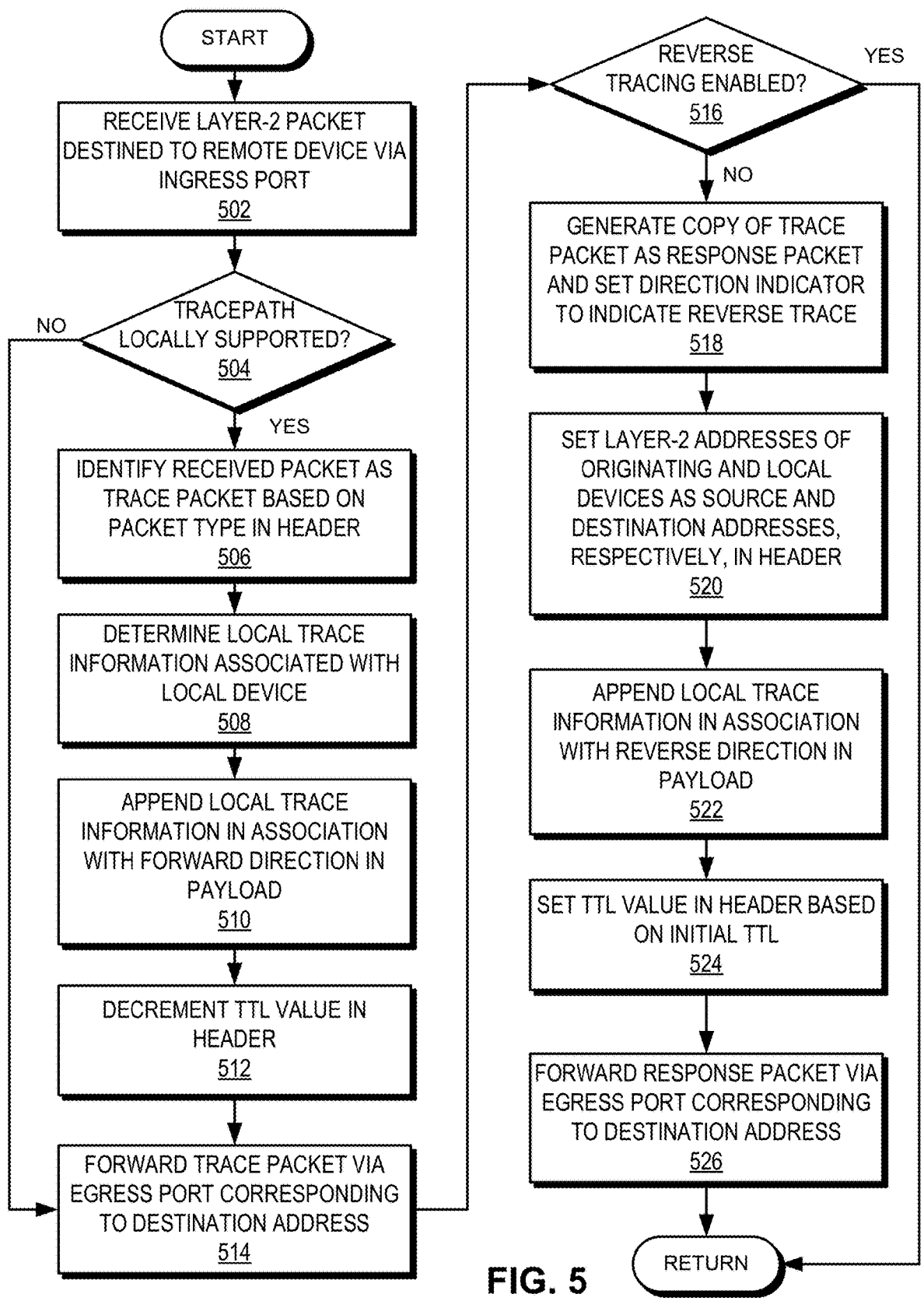
FIG. 5 presents a flowchart illustrating the process of an intermediate device processing a layer-2 path tracing packet, in accordance with an aspect of the present application.

FIG. 5 presents a flowchart illustrating the process of an intermediate device processing a layer-2 path tracing packet, in accordance with an aspect of the present application. During operation, the device may receive a layer-2 trace packet destined to a remote device via an ingress port (operation 502). The device can then determine whether tracepath is locally supported by the device (operation 504). If tracepath is locally supported, the device can identify the received packet as a trace packet based on the packet type in the header (operation 506) and determine the local trace information associated with the local device (operation 508).

The device can then append the local trace information in association with the forward direction in the payload (operation 510). The device can then decrement the TTL value in the header (operation 512). If tracepath is not locally supported (operation 504) or the TTL value is decremented in the header (operation 512), the device can forward the trace packet via the egress port corresponding to the destination address (operation 514). The device may check whether reverse tracing is enabled for intermediate devices (operation 516).

If reverse tracing is enabled for intermediate devices, the device can generate a copy of the trace packet as a response packet and set the direction indicator to indicate reverse trace (operation 518). The device can set the layer-2 addresses of originating and local devices as source and destination addresses, respectively, in the header (operation 520). The device can append the local trace information in association with the reverse direction in the payload (operation 522). The device can set the TTL value in the header based on an initial TTL value (operation 524). The device can then forward the response packet via the egress port corresponding to the destination address (operation 526).

Figure 6:
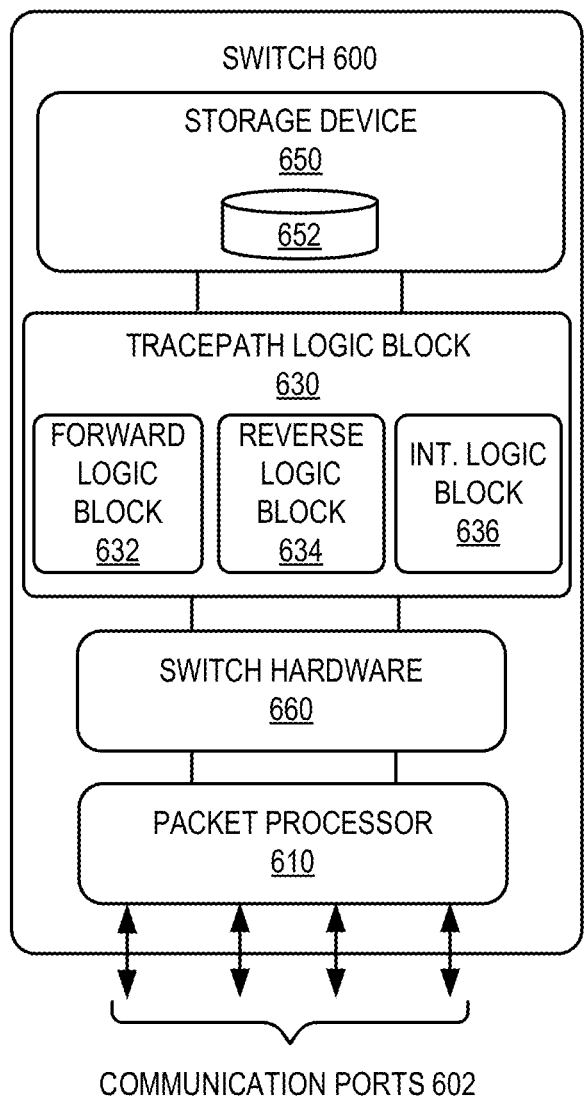
FIG. 6 illustrates an example of a switch with layer-2 path-tracing support, in accordance with an aspect of the present application.

FIG. 6 illustrates an example of a switch with layer-2 path-tracing support, in accordance with an aspect of the present application. In this example, a switch 600 can include a number of communication ports 602, a packet processor 610, and a storage device 650. Switch 600 can also include switch hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include a tracepath logic block 630 that can facilitate a tracepath instance on switch 600. Tracepath logic block 630 can include a forward logic block 632, a reverse logic block 634, and an intermediate logical block 636.

Forward logic block 632 can allow switch 600 to operate as an originating device for forward tracing using tracepath. To do so, forward logic block 632 may issue a layer-2 path tracing packet, as described in conjunction with FIG. 4A. Reverse logic block 634 can allow switch 600 to operate as a target device for reverse tracing using tracepath. To do so, reverse logic block 634 may process a layer-2 path tracing packet and initiate reverse tracing, as described in conjunction with FIG. 4B. Intermediate logic block 636 can allow switch 600 to operate as an intermediate device for tracing using tracepath. To do so, intermediate logic block 636 may continue with forward tracing and initiate reverse tracing, as described in conjunction with FIG. 5.

Figure 7:
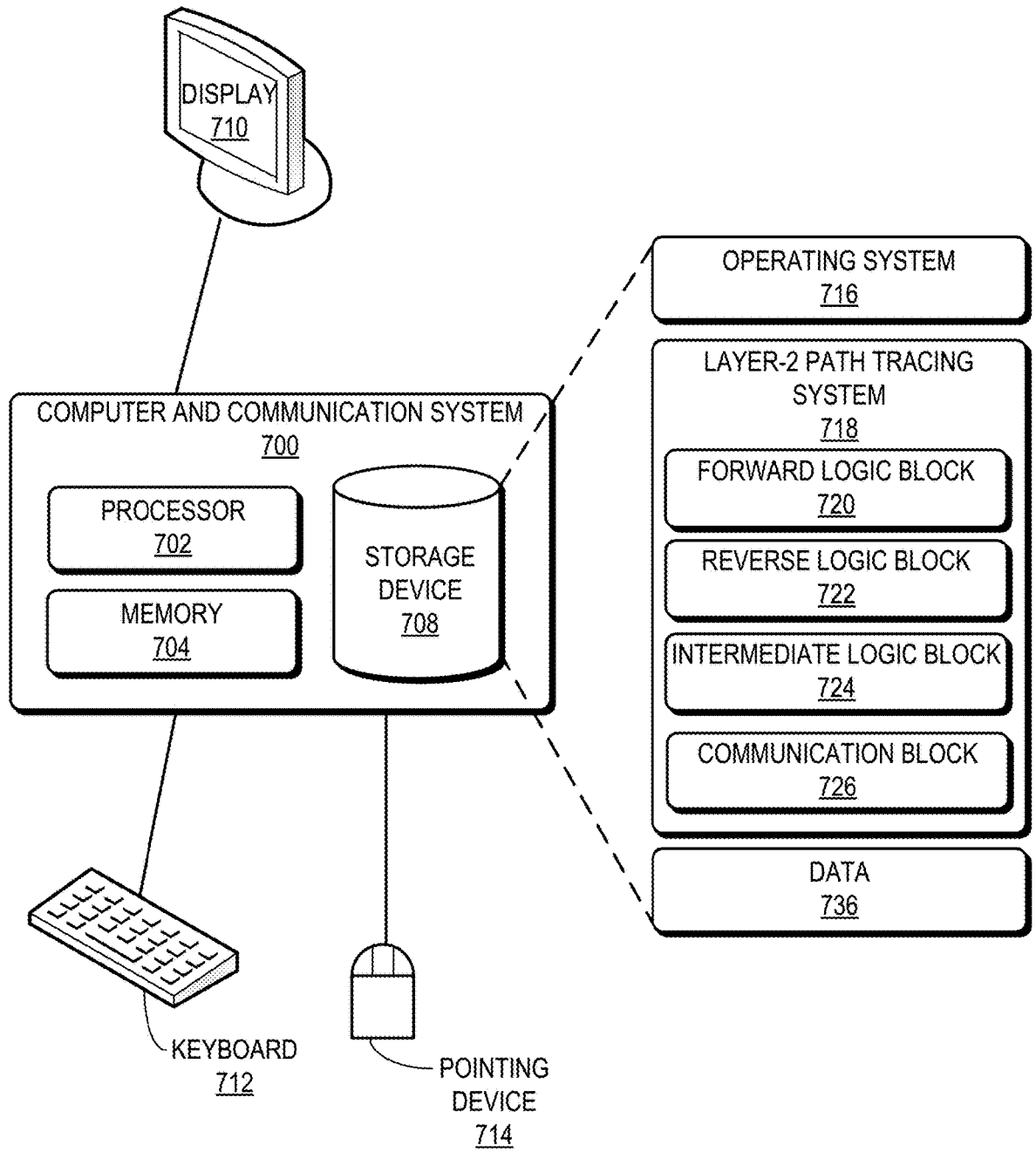
FIG. 7 illustrates an example of a computer system with layer-2 path-tracing support, in accordance with an aspect of the present application.

FIG. 7 illustrates an example of a computer system with layer-2 path-tracing support, in accordance with an aspect of the present application. Computer and communication system 700 includes a processor 702, a memory device 704, and a storage device 708. Memory device 704 can include a volatile memory device (e.g., a dual in-line memory module (DIMM)). Furthermore, computer and communication system 700 can be coupled to a display device 710, a keyboard 712, and a pointing device 714. Storage device 708 can store an operating system 716, a layer-2 path tracing system 718, and data 736. Layer-2 path tracing system 718 can facilitate a tracepath instance on computer and communication system 700.

Layer-2 path tracing system 718 can include instructions, which when executed by computer and communication system 700 can cause computer and communication system 700 to perform methods and/or processes described in this disclosure. Specifically, layer-2 path tracing system 718 can include instructions for issuing a layer-2 path tracing packet (forward logic block 720). Layer-2 path tracing system 718 can also include instructions for processing a layer-2 path tracing packet and initiating reverse tracing (reverse logic block 722). Furthermore, layer-2 path tracing system 718 can include instructions for continuing with forward tracing and initiating reverse tracing (intermediate logic block 724).

Layer-2 path tracing system 718 may further include instructions for sending and receiving messages, such as trace and response packets (communication logic block 734). Data 736 can include any data that can facilitate the operations of layer-2 path tracing system 718. Data 736 can include, but are not limited to, trace information associated with computer and communication system 700.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
sending, by an originating device, a layer-2 trace packet with a packet type in a layer-2 header of the layer-2 trace packet, wherein the packet type indicates the layer-2 trace packet as a packet for layer-2 path tracing;
receiving a layer-2 response packet from a respective participating device along a path to a target device of the layer-2 trace packet, wherein the participating device supports the layer-2 path tracing;
obtaining, from a payload of the layer-2 response packet, trace information associated with a forward path to the participating device traversed by the layer-2 trace packet and a reverse path from the participating device traversed by the layer-2 response packet, wherein the trace information in the layer-2 response packet identifies a plurality of layer-2 devices along the forward and reverse paths, and wherein the trace information includes a plurality of layer-2 network addresses identifying the plurality of layer-2 devices, respectively; and determining a layer-2 path trace, which includes at least the plurality of layer-2 network addresses, between the originating device and the target device based on the trace information.

2. The method of claim 1, wherein the layer-2 trace packet and the layer-2 response packet are associated with a virtual local area network (VLAN), and wherein the identified plurality of layer-2 devices belong to the VLAN.

3. The method of claim 1, wherein the trace information, for a respective of the identified plurality of layer-2 devices, further includes one or more of: a port identifier and a hostname.

4. The method of claim 1, further comprising encapsulating the layer-2 trace packet in a tunnel header associated with a tunnel between the originating device and a remote endpoint, wherein the tunnel is formed based on a tunneling protocol.

5. The method of claim 4, wherein the trace information indicates the tunnel as a layer-2 hop.

6. The method of claim 1, further comprising setting a time-to-leave (TTL) value in the header based on a predetermined initial value, wherein the initial value indicates a number of layer-2 hops to be traced, and wherein the TTL value is decremented at a respective participating device.

7. The method of claim 6, further comprising receiving the layer-2 response packet from a participating device at which the TTL value has reached an expiration value, wherein the layer-2 response packet includes an indicator indicating the TTL value reaching the expiration value.

8. The method of claim 1, further comprising setting a layer-2 network address of the target device as a destination address of the layer-2 trace packet, wherein the destination address is not modified for the layer-2 trace packet at a respective layer-2 hop.

9. The method of claim 1, wherein a direction indicator in the layer-2 trace packet indicates a forward direction to the target device, and wherein the direction indicator in the layer-2 response packet indicates a reverse direction to the originating device.

10. The method of claim 1, wherein the forward and reverse paths include one or more non-participating devices that do not support the layer-2 path tracing, wherein the non-participating devices include one or more of: an intermediate device and the target device.

11. A non-transitory computer-readable storage medium storing instructions that when executed by a computer cause the computer to perform a method, the method comprising:
sending, from an originating device, a layer-2 trace packet with a packet type in a layer-2 header of the layer-2 trace packet, wherein the packet type indicates the layer-2 trace packet as a packet for layer-2 path tracing;
receiving a layer-2 response packet from a respective participating device on a path to a target device of the layer-2 trace packet, wherein the participating device supports the layer-2 path tracing;
obtaining, from a payload of the layer-2 response packet, trace information associated with a forward path to the participating device traversed by the layer-2 trace packet and a reverse path from the participating device traversed by the layer-2 response packet, wherein the trace information in the layer-2 response packet identifies a plurality of layer-2 devices along the forward and reverse paths, and wherein the trace information includes a plurality of layer-2 network addresses identifying the plurality of layer-2 devices, respectively; and determining a layer-2 path trace, which includes at least the plurality of layer-2 network addresses, between the originating device and the target device based on the trace information.

12. The non-transitory computer-readable storage medium of claim 11, wherein the layer-2 trace packet and the layer-2 response packet are associated with a virtual local area network (VLAN), and wherein the identified plurality of layer-2 devices belong to the VLAN.

13. The non-transitory computer-readable storage medium of claim 11, wherein the trace information, for a respective of the identified plurality of layer-2 devices, further includes one or more of: a port identifier and a hostname.

14. The non-transitory computer-readable storage medium of claim 11, wherein the method further comprises encapsulating the layer-2 trace packet in a tunnel header associated with a tunnel between the originating device and a remote endpoint, wherein the tunnel is formed based on a tunneling protocol, and wherein the trace information indicates the tunnel as a layer-2 hop.

15. The non-transitory computer-readable storage medium of claim 11, wherein the method further comprises setting a time-to-leave (TTL) value in the header based on a predetermined initial value, wherein the initial value indicates a number of layer-2 hops to be traced, and wherein the TTL value is decremented at a respective participating device.

16. The non-transitory computer-readable storage medium of claim 15, wherein the method further comprises receiving the layer-2 response packet from a participating device at which the TTL value has reached an expiration value, wherein the layer-2 response packet includes an indicator indicating the TTL value reaching the expiration value.

17. The non-transitory computer-readable storage medium of claim 11, wherein the method further comprises setting a layer-2 network address of the target device as a destination address of the layer-2 trace packet, wherein the destination address is not modified for the layer-2 trace packet at a respective layer-2 hop.

18. The non-transitory computer-readable storage medium of claim 11, wherein a direction indicator in the layer-2 trace packet indicates a forward direction to the target device, and wherein the direction indicator in the layer-2 response packet indicates a reverse direction to the originating device.

19. The non-transitory computer-readable storage medium of claim 11, wherein the forward and reverse paths include one or more non-participating devices that do not support the layer-2 path tracing, wherein the non-participating devices include one or more of: an intermediate device and the target device.

20. A computer system, comprising:
at least one processing resource; and
a storage device storing instructions executable by the at least one processing resource to:
send a layer-2 trace packet with a packet type in a layer-2 header of the layer-2 trace packet, wherein the packet type indicates the layer-2 trace packet as a packet for layer-2 path tracing;
receive a layer-2 response packet from a respective participating device on a path to a target device of the layer-2 trace packet, wherein the participating device supports layer-2 path tracing;

obtain, from a payload of the layer-2 response packet, trace information associated with a forward path to the participating device traversed by the layer-2 trace packet and a reverse path from the participating device traversed by the layer-2 response packet, wherein the trace information in the layer-2 response packet identifies a plurality of layer-2 devices along the forward and reverse paths, and wherein the trace information includes a plurality of layer-2 network addresses identifying the plurality of layer-2 devices, respectively; and determine a layer-2 path trace, which includes at least the plurality of layer-2 network addresses, between the originating device and the target device based on the trace information.

* * * * *